(12) United States Patent
Han et al.

(10) Patent No.: US 11,530,139 B2
(45) Date of Patent: Dec. 20, 2022

(54) TYPE-2 FUZZY NEURAL NETWORK-BASED COOPERATIVE CONTROL METHOD FOR WASTEWATER TREATMENT PROCESS

(71) Applicant: BEIJING UNIVERSITY OF TECHNOLOGY, Beijing (CN)

(72) Inventors: Honggui Han, Beijing (CN); Jiaming Li, Beijing (CN); Xiaolong Wu, Beijing (CN); Junfei Qiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 469 days.

(21) Appl. No.: 16/694,911

(22) Filed: Nov. 25, 2019

(65) Prior Publication Data

US 2021/0087074 A1 Mar. 25, 2021

(30) Foreign Application Priority Data

Sep. 23, 2019 (CN) .......................... 201910899611.7

(51) Int. Cl.
*C02F 1/20* (2006.01)
*G06N 20/10* (2019.01)
(Continued)

(52) U.S. Cl.
CPC ................ *C02F 1/20* (2013.01); *C02F 1/586* (2013.01); *C02F 3/305* (2013.01);
(Continued)

(58) Field of Classification Search
CPC .. C02F 1/20; C02F 1/586; C02F 3/305; C02F 2101/163; G05B 13/0285; G06F 17/16;
(Continued)

(56) References Cited

U.S. PATENT DOCUMENTS 7,413,654 B2 * 8/2008 Applegate ............... C02F 3/006
210/605

OTHER PUBLICATIONS

Han, Hong-Gui, et al. "A self-organizing interval Type-2 fuzzy-neural-network for modeling nonlinear systems." Neurocomputing 290 (May 2018): 196-207. (Year: 2018).*

(Continued)

*Primary Examiner* — Benjamin P Geib
(74) *Attorney, Agent, or Firm* — J.C. Patents

(57) ABSTRACT

A cooperative fuzzy-neural control method is designed in this present invention. Due to the difficulty for cooperatively controlling the concentrations of the dissolved oxygen and nitrate nitrogen in wastewater treatment process, a cooperative fuzzy-neural control method is investigated. In this proposed method, firstly, a interval type-2 fuzzy neural network is employed to construct the cooperative fuzzy-neural controller. Secondly, a parameter cooperative strategy is proposed to cooperatively optimize the global and local parameters of the cooperative fuzzy-neural controller to meet the control requirements. This proposed cooperative fuzzy-neural control method can cooperatively control the concentrations of the dissolved oxygen and nitrate nitrogen in wastewater treatment process. The results illustrate that the proposed cooperative fuzzy-neural control method can achieve the high control accuracy and guarantee the normal operations of wastewater treatment process under the different operation conditions.

1 Claim, 6 Drawing Sheets

(51) Int. Cl.
*C02F 1/58* (2006.01)
*C02F 3/30* (2006.01)
*G05B 13/02* (2006.01)
*G06F 17/16* (2006.01)
*G06F 17/18* (2006.01)
*G06N 3/04* (2006.01)
*G06N 3/08* (2006.01)
*C02F 101/16* (2006.01)

(52) U.S. Cl.
CPC ......... *G05B 13/0285* (2013.01); *G06F 17/16* (2013.01); *G06F 17/18* (2013.01); *G06N 3/0436* (2013.01); *G06N 3/08* (2013.01); *G06N 20/10* (2019.01); *C02F 2101/163* (2013.01)

(58) Field of Classification Search
CPC ........ G06F 17/18; G06N 3/0436; G06N 3/08; G06N 20/10
See application file for complete search history.

(56) References Cited

OTHER PUBLICATIONS

Qiao, Jun-Fei, et al. "Adaptive fuzzy neural network control of wastewater treatment process with multiobjective operation." Neurocomputing 275 (Jan. 2018): 383-393. (Year: 2018).*

Honggui, Han, Li Ying, and Qiao Junfei. "A fuzzy neural network approach for online fault detection in waste water treatment process." Computers & Electrical Engineering 40.7 (Oct. 2014): 2216-2226. (Year: 2014).*

* cited by examiner

TYPE-2 FUZZY NEURAL NETWORK-BASED COOPERATIVE CONTROL METHOD FOR WASTEWATER TREATMENT PROCESS

CROSS-REFERENCE TO RELATED PATENT APPLICATIONS

This application claims priority to Chinese Patent Application No. 201910899611.7, filed on Sep. 23, 2019, entitled "A type-2 fuzzy neural network-based cooperative control method for wastewater treatment process," which is hereby incorporated by reference in its entirety.

TECHNICAL FIELD

In this present invention, a type-2 fuzzy neural network-based cooperative control (T2FNN-CC) method is designed to achieve the cooperative control of the dissolved oxygen (DO) and nitrate nitrogen ($NO_3$—N) concentrations in wastewater treatment process (WWTP). The concentration of DO and $NO_3$—N is the key control variables in WWTP, and play an important role for improving the effluent quality and energy consumption. It is feasible to implement the proposed T2FNN-CC in WWTP, and control the concentrations of the DO and $NO_3$—N cooperatively. This method can ensure the normal operation of WWTP under the different operation conditions. The technology of this present invention belongs to the field of water research and intelligent control.

BACKGROUND

The rapid growth of the global population and the rapid development of manufacturing industry accelerate the consumption of water resources, and produce a large amount of wastewater. In recent years, many countries have introduced a variety of environmental legislation to regulate the emission processes of wastewater and improve the emission standards to protect the environment. Wastewater treatment plants need to meet more requirements to reach the discharge standards. Meanwhile, the variable operation conditions is a great challenge to the stable operation of WWTP. Therefore, the research results of the present invention has the important significance for ensuring the stable operation of WWTP.

As the key control variables, the DO and $NO_3$—N concentrations can directly control the biochemical reaction processes in WWTP. In the wastewater treatment plants, the activated sludge process, which includes the ammonification reaction, nitrification reaction and denitrification reaction, is the most popular wastewater treatment method and the pollutants in wastewater can be removed by degrading the organic matter. The ammonification reaction can convert the organic nitrogen compounds into ammonia nitrogen, the nitration reaction can synthesize the ammonia nitrogen into $NO_3$—N, and the denitrification reaction can decompose the $NO_3$—N into nitrogen. Although these above reactions can achieve the effective removal of organic matter, it is difficult to control these reaction processes. For example, the nitration reaction is a kind of aerobic reaction and the sufficient DO concentration will promote the degradation of ammonia nitrogen in the nitration reaction. On the contrary, the denitrification reaction requires an anoxic environment and the $NO_3$—N concentration can be removed by the denitrification reaction under the hypoxic conditions. It is difficult to control both the nitration and denitrification reactions due to these conflicting conditions. The high DO concentration will affect the nitration and denitrification reactions and the $NO_3$—N concentration is a primary factor for the denitrification reaction. Therefore, it is urgent to control the DO and $NO_3$—N concentrations cooperatively. The type-2 fuzzy neural network can use the type-2 fuzzy rule to express the change of the process variables in WWTP and deal with the strong nonlinear and high uncertainty of WWTP. The proposed T2FNN-CC has strong robustness and high control precision, and use a parameter cooperative strategy to optimize the global and local parameters of type-2 fuzzy neural network to improve the control response speed and realize cooperative control of the DO and $NO_3$—N concentrations. The proposed T2FNN-CC can ensure the stable operation of WWTP under the different operation conditions, and has the practical application value.

In this present invention, a T2FNN-CC method is designed for controlling the DO and $NO_3$—N concentrations of WWTP, where the type-2 fuzzy neural network controller is used to control the controlled variables, and the parameter cooperative strategy is employed to update the global and local parameters of the type-2 fuzzy neural network controller.

SUMMARY

In this present invention, a T2FNN-CC method is designed. This proposed T2FNN-CC method can solve the control values of the DO and $NO_3$—N concentrations, and utilize the aeration value and internal backflow value to achieve the cooperative control of the DO and $NO_3$—N concentrations. The proposed T2FNN-CC method can ensure that the discharge standards are met, and improve the stability of WWTP under the different operation conditions.

The present invention adopts the following technical scheme and implementation steps:

A type-2 fuzzy neural network-based cooperative control method for controlling the dissolved oxygen (DO) and nitrate nitrogen ($NO_3$—N) concentrations of wastewater treatment process (WWTP), wherein aeration value and internal backflow value are used as control variables, the DO and $NO_3$—N concentrations are used as controlled variables, the method comprising the following steps:

(1) design a type-2 fuzzy neural network (T2FNN) for controlling the DO and $NO_3$—N concentrations, the T2FNN contains five-layers: an input layer, a membership layer, a rule layer, a consequent layer and an output layer, wherein:

the input layer contains 4 input neurons and an input vector is:

$$X(t)=[x_1(t),x_2(t),x_3(t),x_4(t)]^T \tag{1}$$

where $X(t)$ is the input vector of T2FNN at time t, $x_1(t)$ is an error between a set-point and a measured value of DO concentration at time t, $x_2(t)$ is an error variation between the set-point and the measured value of DO concentration at time t, $x_3(t)$ is an error between a set-point and a measured value of $NO_3$—N concentration at time t, $x_4(t)$ is an error variation between the set-point and the measured value of $NO_3$—N concentration at time t, T represents a revolution of the matrix and vector;

the membership layer contains P membership neurons and a neuron represents an interval type-2 membership function:

$$\underline{m}_{ij}(x_i(t)) = \begin{cases} e^{-\frac{1}{2}\left(\frac{x_i(t)-\overline{c}_{ij}(t)}{\sigma_{ij}(t)}\right)^2}, & x_i(t) \le (\underline{c}_{ij}(t)+\overline{c}_{ij}(t))/2 \\ e^{-\frac{1}{2}\left(\frac{x_i(t)-\underline{c}_{ij}(t)}{\sigma_{ij}(t)}\right)^2}, & x_i(t) > (\underline{c}_{ij}(t)+\overline{c}_{ij}(t))/2 \end{cases} \tag{2}$$

-continued $$\overline{m}_{ij}(x_i(t)) = \begin{cases} e^{-\frac{1}{2}\left(\frac{x_i(t)-\underline{c}_{ij}(t)}{\sigma_{ij}(t)}\right)^2}, & x_i(t) \leq \underline{c}_{ij}(t) \\ 1, & \underline{c}_{ij}(t) < x_i(t) < \overline{c}_{ij}(t) \\ e^{-\frac{1}{2}\left(\frac{x_i(t)-\overline{c}_{ij}(t)}{\sigma_{ij}(t)}\right)^2}, & x_i(t) \geq \overline{c}_{ij}(t) \end{cases} \quad (3)$$

where P is the total number of membership neurons, P=4M, M is the total number of rule neurons, $1<M\leq 15$, $\underline{m}_{ij}(t)$ is a lower membership value of ith input to jth rule neuron at time t, $\overline{m}_{ij}(t)$ is an upper membership value of the ith input to the jth rule neuron at time t, $0<\underline{m}_{ij}(t)<\overline{m}_{ij}(t)\leq 1$, e is a natural constant and e=2.7183, $\underline{c}_{ij}(t)$ is a lower center of the ith input with the jth rule neuron at time t, $\overline{c}_{ij}(t)$ is an upper center of the ith input with the jth rule neuron at time t, $1<\underline{c}_{ij}(t)<\overline{c}_{ij}(t)<5$, $\sigma_{ij}(t)$ is standard deviation of the ith input with the jth rule neuron at time t, i is the number of inputs in the T2FNN and i=1, 2, 3, 4, j is the number of rule neurons and j=1, 2, . . . , M;

the rule layer contains M rule neurons, an output of each neuron is:

$$F_j(t) = \left[\underline{f}_j(t), \overline{f}_j(t)\right] \quad (4)$$

$$\underline{f}_j(t) = \prod_{i=1}^{4}\underline{m}_{ij}(t), \overline{f}_j(t) = \prod_{i=1}^{4}\overline{m}_{ij}(t) \quad (5)$$

where $F_j(t)$ is firing strength of jth rule neuron at time t, $\underline{f}_j(t)$ is lower firing strength of the jth rule neuron at time t, $\overline{f}_j(t)$ is upper firing strength of the jth rule neuron at time t, $0<\underline{f}_j(t)<\overline{f}_j(t)\leq 1$;

the consequent layer contains 4 consequent neurons, an output of each neuron is:

$$\underline{y}_k(t) = \frac{\sum_{j=1}^{M}\underline{f}_j(t)h_j^k(t)}{\sum_{j=1}^{M}\underline{f}_j(t)}, \overline{y}_k(t) = \frac{\sum_{j=1}^{M}\overline{f}_j(t)h_j^k(t)}{\sum_{j=1}^{M}\overline{f}_j(t)} \quad (6)$$

$$h_j^k(t) = \sum_{i=1}^{4}w_{ij}^k(t)x_i(t) + b_j^k(t)$$

where $\underline{y}_k(t)$ is a lower output of consequent neuron with respect to kth output neuron at time t, $\overline{y}_k(t)$ is an upper output of consequent neuron with respect to the kth output neuron at time t, hk j(t) is jth consequent factor with respect to the kth output at time t, wk ij(t) is a consequent weight of ith input with respect to jth rule neuron and the kth output at time t, bk j (t) is the deviation of the jth rule neuron with respect to the kth output at time t, k=1, 2;

the output layer contains 2 neurons, an output of each neuron is:

$$\Delta u_k(t) = q^k(t)\underline{y}_k(t) + (1-q^k(t))\overline{y}_k(t) \quad (7)$$

where $\Delta u_k(t)$ is an output of kth output neuron at time t, $q^k(t)$ is a scale factor of the kth output neuron, $0<q^k(t)<1$;

(2) train T2FNN, which includes:

1) divide parameters of T2FNN into global and local parameters, and define a global parameter vector and a local parameter vector as:

$$\Phi_g(t) = [\underline{c}_{ij}(t), \overline{c}_{ij}(t), \sigma_{ij}(t)]$$

$$\Phi_l(t) = [w_{ij}^k(t), b_j^k(t), q^k(t)] \quad (8)$$

where $\Phi_g(t)$ is the global parameter vector at time t, $\Phi_l(t)$ is the local parameter vector at time t, and an objective function is:

$$l(t) = \alpha(t)l^1(t) + (1-\alpha(t))l^2(t) \quad (9)$$

$$\alpha(t) = \frac{|l^1(t)|}{|l^1(t)| + |l^2(t)|}$$

$$l^1(t) = y_d^1(t) - y^1(t)$$

$$l^2(t) = y_d^2(t) - y^2(t)$$

where l(t) is a composite error at time t, $\alpha(t)$ is an error coefficient at time t, $l^1(t)$ is the error between the set-point and measured value of DO concentration at time t, $l^2(t)$ the error between the set-point and measured value of $NO_3$—N concentration at time t, y1 d(t) is the set-point of DO concentration at time t, y2 d(t) is the set-point of $NO_3$—N concentration at time t, $y^1(t)$ is a real value of DO concentration at time t, $y^2(t)$ is a real value of $NO_3$—N concentration at time t;

2) utilize parameter cooperative strategy to optimize the global and local parameters of T2FNN cooperatively, an updating rule of parameters is:

$$\Phi(t+1) = \Phi(t) + (H(t) + \theta(t)I)^{-1}G_l(t) \quad (10)$$

$$H(t) = J^T(t)J(t)$$

$$G_l(t) = J^T(t)l(t)$$

$$\theta(t) = \left|\frac{l(t)}{l(t)+l(t-1)}\right|\theta(t-1)$$

$$J(t) = \left[\frac{\partial l(t)}{\partial \Phi_g(t)}, \frac{\partial l(t)}{\partial \Phi_l(t)}\right] =$$

$$\left[\frac{\partial l(t)}{\partial \underline{c}_{ij}(t)}, \frac{\partial l(t)}{\partial \overline{c}_{ij}(t)}, \frac{\partial l(t)}{\partial \sigma_{ij}(t)}, \frac{\partial l(t)}{\partial w_{ij}^k(t)}, \frac{\partial l(t)}{\partial b_j^k(t)}, \frac{\partial l(t)}{\partial q^k(t)}\right]$$

where $\Phi(t+1)$ is a parameter vector at time t+1, $\Phi(t)$ is a parameter vector at time t, I is a unit matrix, H(t) is a quasi Hessian matrix at time t, $G_l(t)$ is an error gradient vector at time t, $\theta(t)$ is an adaptive learning rate at time t and $\theta(t) \in (0, 1]$, J(t) is a Jacobian vector at time t, $\partial l(t)/\partial \Phi_g(t)$ is a partial derivative of the composite error with respect to the global parameter vector at time t, $\partial l(t)/\partial \Phi_l(t)$ is a partial derivative of the composite error with respect to the local parameter vector at time t, $\partial l(t)/\partial \underline{c}_{ij}(t)$ is partial derivatives of the composite error with respect to lower uncertain center at time t, $\partial l(t)/\partial \overline{c}_{ij}(t)$ is partial derivatives of the composite error with respect to the upper uncertain center at time t, $\partial l(t)/\partial \sigma_{ij}(t)$ is partial derivatives of the composite error with respect to the standard deviation at time t, $\partial l(t)/\partial wk\ ij(t)$ is partial derivative of the composite error with respect to the consequent weight at time t, $\partial l(t)/\partial bk\ j(t)$ is partial derivative of the composite error with respect to the deviation at time t, $\partial l(t)/\partial q^k(t)$ is partial derivative of the composite error with respect to the scale factor at time t;

(3) design the type-2 fuzzy neural network-based cooperative control method for controlling the DO and $NO_3$—N concentrations of WWTP, which includes:

1) calculate outputs of T2FNN according to Eq. (7);

2) compare a value of composite error with a pre-set threshold, if $l(t)>\beta$, go to step 3), and if $l(t)\leq\beta$, go to step 4), where $\beta$ is the pre-set threshold and $\beta=0.01$;

3) calculate updated values of parameters according to Eq. (10);
4) calculate control outputs at current time:

$$u_k(t)=u_k(t-1)+\Delta u_k(t) \tag{11}$$

where $u_k(t)$ is kth control output at time t, $u_1(t)$ is the control output with respect to an aeration value at time t, $u_2(t)$ is the control output with respect to an internal backflow value at time t, $u_k(t-1)$ is kth control output at time t−1, 5) enter $u_k(t)$ into WWTP to control the DO and $NO_3$—N concentrations, return to step 1);

(4) use $u_1(t)$ and $u_2(t)$ to control the concentration of DO and $NO_3$—N in WWTP, $u_1(t)$ is the control input of the aeration value at time t, $u_2(t)$ is the control input of the internal backflow value at time t, the control results are the concentrations of DO and $NO_3$—N in WWTP.

The Novelties of this Present Disclosure Contain:

(1) WWTP is a complex industrial process with the strong nonlinearity, high uncertainties and multiple disturbances, and the exact mathematic model of WWTP is difficult to design according to the general methods. Since the artificial neural network owns the strong learning ability and approximation capability, the T2FNN-CC method can be employed to achieve the precise and stable control for WWTP under the different operation conditions.

(2) In this present invention, a T2FNN-CC method is studied to realize the cooperative control of the DO and $NO_3$—N concentrations. This proposed T2FNN-CC method can utilize the robustness of T2FNN and the parameter cooperative strategy to meet the control requirements for WWTP under the different operations conditions, and address the difficulty of the stability control in WWTP.

Attention: for the convenience of the description, the proposed T2FNN-CC method is used to control the DO and $NO_3$—N concentrations of WWTP cooperatively. All of the control methods, which utilize the principle of this present invention, also belong to the scope of this present invention.

DETAILED DESCRIPTION

In this present invention, a T2FNN-CC method is designed. This proposed T2FNN-CC method can solve the control values of the DO and $NO_3$—N concentrations, and utilize the aeration value and internal backflow value to achieve the cooperative control of the DO and $NO_3$—N concentrations. The proposed T2FNN-CC method can ensure that the discharge standards are met, and improve the stability of WWTP under the different operation conditions.

Figure 1:
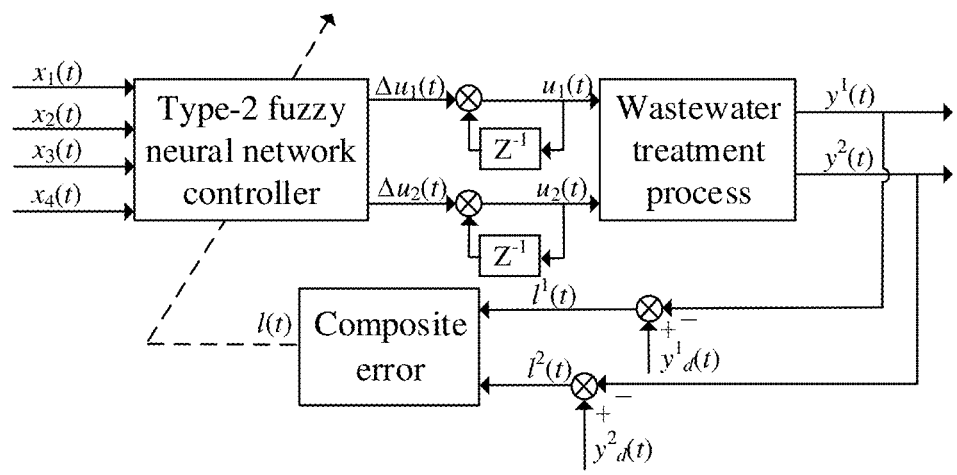
FIG. 1 shows the control scheme of this present invention.
Figure 2:
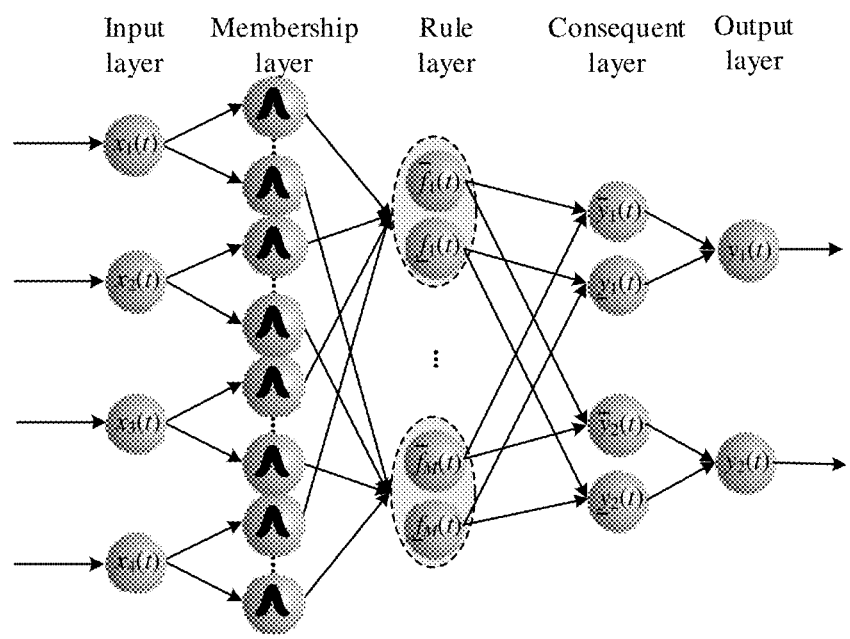
FIG. 2 shows the structure of T2FNN in T2FNN-CC method
Figure 3:
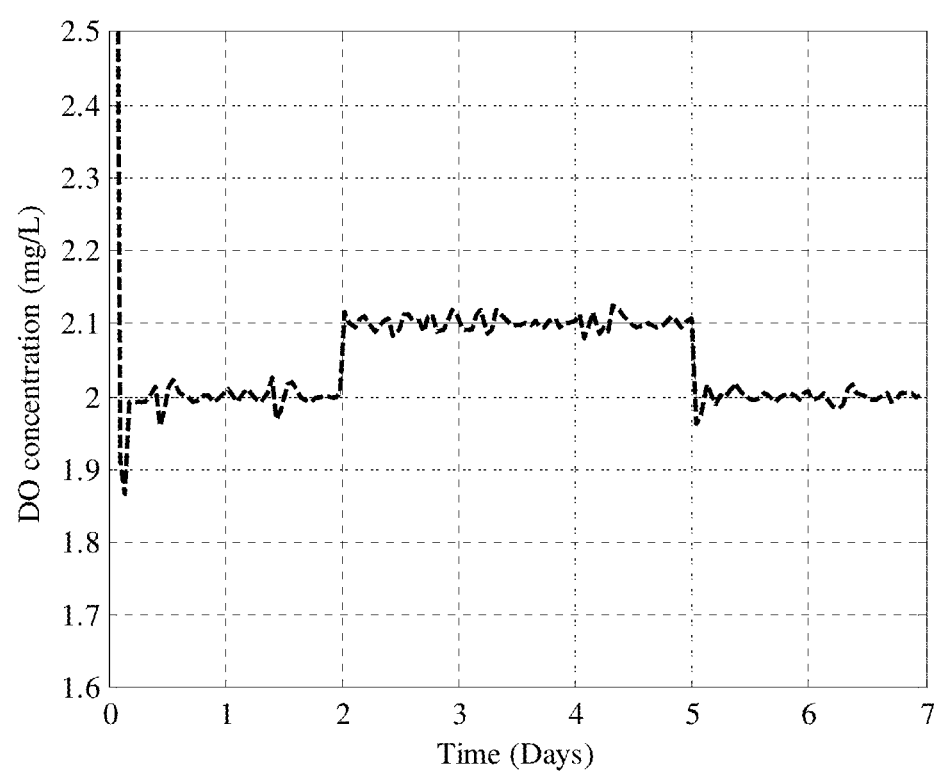
FIG. 3 shows the control results of DO concentration in T2FNN-CC method.
Figure 4:
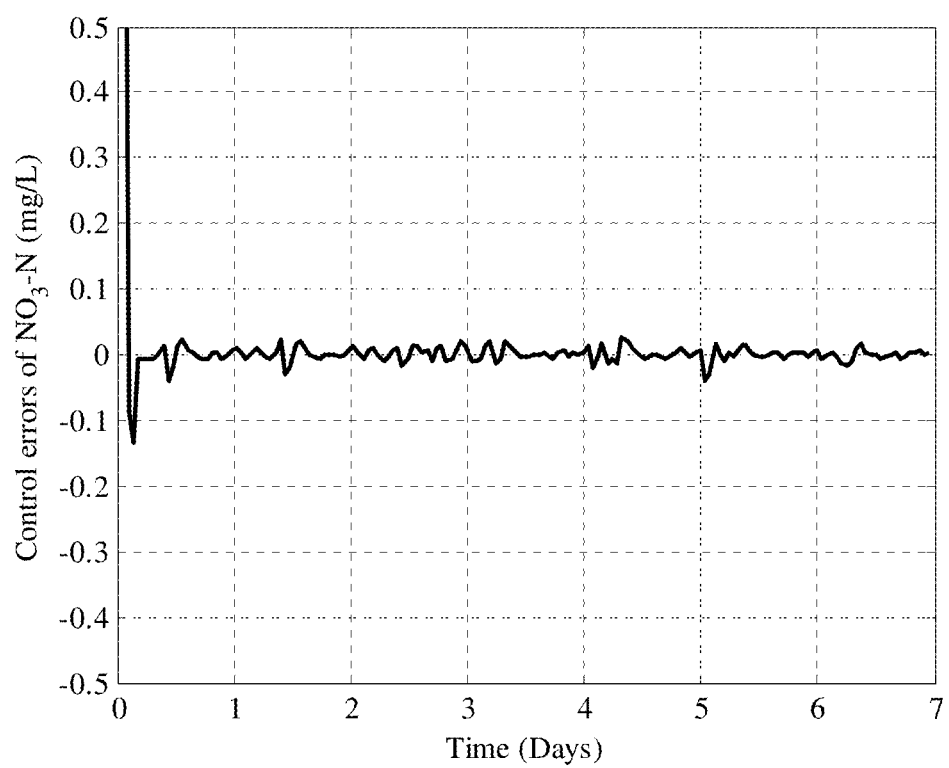
FIG. 4 shows the control errors of DO concentration in T2FNN-CC method.
Figure 5:
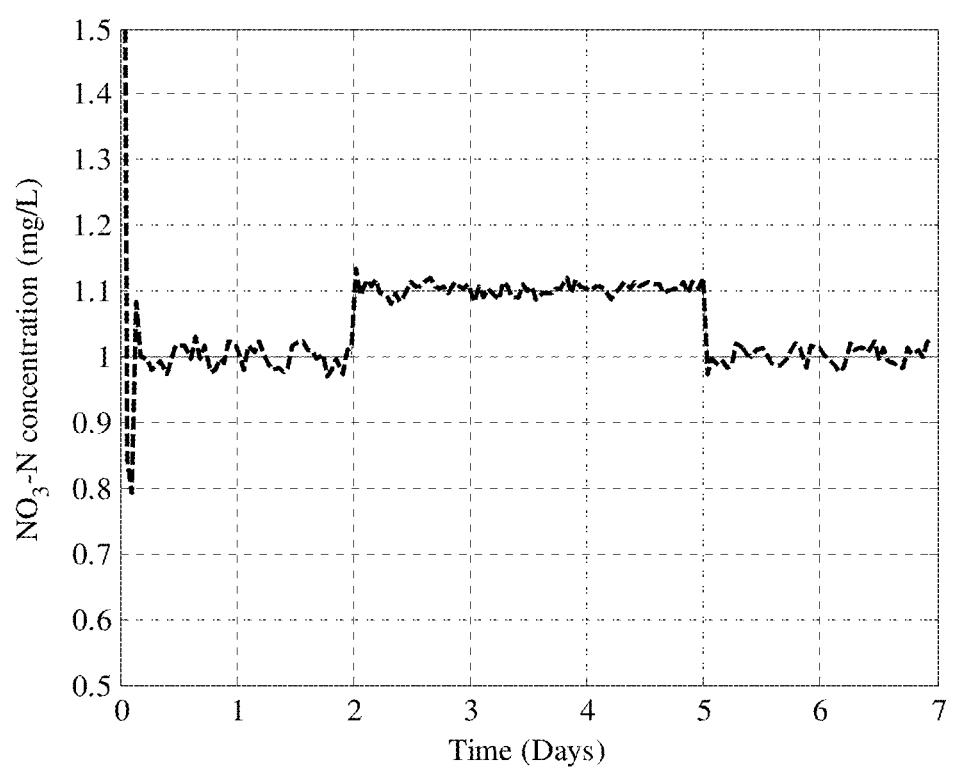
FIG. 5 shows the control results of $NO_3$—N concentration in T2FNN-CC method.
Figure 6:
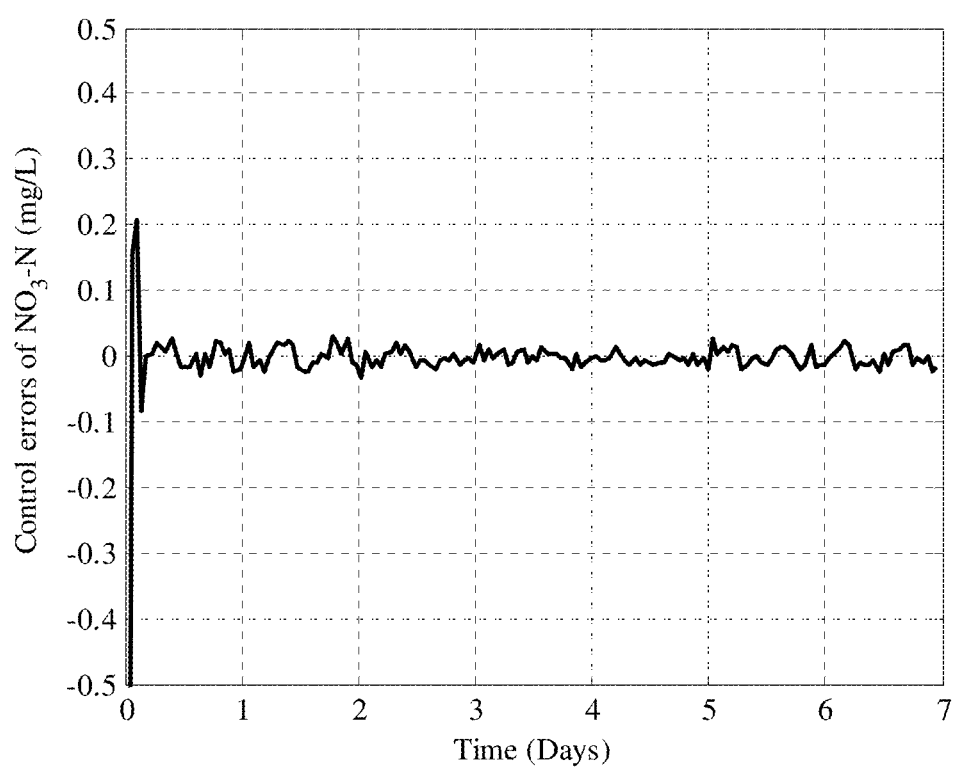
FIG. 6 shows the control errors of $NO_3$—N concentration in T2FNN-CC method.

The present invention adopts the following technical scheme and implementation steps:

A type-2 fuzzy neural network-based cooperative control method for controlling the dissolved oxygen (DO) and nitrate nitrogen ($NO_3$—N) concentrations of wastewater treatment process (WWTP), wherein aeration value and internal backflow value are used as control variables, the DO and $NO_3$—N concentrations are used as controlled variables, the control scheme is shown in FIG. 1, the method comprising the following steps:

(1) design a type-2 fuzzy neural network (T2FNN) for controlling the DO and $NO_3$—N concentrations, the T2FNN contains five-layers: an input layer, a membership layer, a rule layer, a consequent layer and an output layer, the structure of T2FNN is shown in FIG. 2 and the details of the layers:

wherein:

the input layer contains 4 input neurons and an input vector is:

$$X(t)=[x_1(t),x_2(t),x_3(t),x_4(t)]^T \tag{1}$$

where $X(t)$ is the input vector of T2FNN at time t, $x_1(t)$ is an error between a set-point and a measured value of DO concentration at time t, $x_2(t)$ is an error variation between the set-point and the measured value of DO concentration at time t, $x_3(t)$ is an error between a set-point and a measured value of $NO_3$—N concentration at time t, $x_4(t)$ is an error variation between the set-point and the measured value of $NO_3$—N concentration at time t, T represents a revolution of the matrix and vector;

the membership layer contains P membership neurons and a neuron represents an interval type-2 membership function:

$$\underline{m}_{ij}(x_i(t)) = \begin{cases} e^{-\frac{1}{2}\left(\frac{x_i(t)-\overline{c}_{ij}(t)}{\sigma_{ij}(t)}\right)^2}, & x_i(t) \leq (\underline{c}_{ij}(t)+\overline{c}_{ij}(t))/2 \\ e^{-\frac{1}{2}\left(\frac{x_i(t)-\underline{c}_{ij}(t)}{\sigma_{ij}(t)}\right)^2}, & x_i(t) > (\underline{c}_{ij}(t)+\overline{c}_{ij}(t))/2 \end{cases} \tag{2}$$

$$\overline{m}_{ij}(x_i(t)) = \begin{cases} e^{-\frac{1}{2}\left(\frac{x_i(t)-\underline{c}_{ij}(t)}{\sigma_{ij}(t)}\right)^2}, & x_i(t) \leq \underline{c}_{ij}(t) \\ 1, & \underline{c}_{ij}(t) < x_i(t) < \overline{c}_{ij}(t) \\ e^{-\frac{1}{2}\left(\frac{x_i(t)-\overline{c}_{ij}(t)}{\sigma_{ij}(t)}\right)^2}, & x_i(t) \geq \overline{c}_{ij}(t) \end{cases} \tag{3}$$

where P is the total number of membership neurons, P=4M, M is the total number of rule neurons, 1<M≤15, $\underline{m}_{ij}(t)$ is a lower membership value of ith input to jth rule neuron at time t, $\overline{m}_{ij}(t)$ is an upper membership value of the ith input to the jth rule neuron at time t, $0<\underline{m}_{ij}(t)<\overline{m}_{ij}(t)\leq 1$, e is a natural constant and e=2.7183, $\underline{c}_{ij}(t)$ is a lower center of the ith input with the jth rule neuron at time t, $\overline{c}_{ij}(t)$ is an upper center of the ith input with the jth rule neuron at time t, $1<\underline{c}_{ij}(t)<\overline{c}_{ij}(t)<5$, $\sigma_{ij}(t)$ is standard deviation of the ith input with the jth rule neuron at time t, i is the number of inputs in the T2FNN and i=1, 2, 3, 4, j is the number of rule neurons and j=1, 2, . . . , M;

the rule layer contains M rule neurons, an output of each neuron is:

$$F_j(t) = \left[\underline{f}_j(t), \overline{f}_j(t)\right] \tag{4}$$

$$\underline{f}_j(t) = \prod_{i=1}^{4}\underline{m}_{ij}(t), \quad \overline{f}_j(t) = \prod_{i=1}^{4}\overline{m}_{ij}(t) \tag{5}$$

where $F_j(t)$ is firing strength of jth rule neuron at time t, $\underline{f}_j(t)$ is lower firing strength of the jth rule neuron at time t, $\overline{f}_j(t)$ is upper firing strength of the jth rule neuron at time t, $0<\underline{f}_j(t)<\overline{f}_j(t)\leq 1$;

the consequent layer contains 4 consequent neurons, an output of each neuron is:

$$\underline{y}_k(t) = \frac{\sum_{j=1}^{M} \underline{f}_j(t)h_j^k(t)}{\sum_{j=1}^{M} \underline{f}_j(t)}, \quad \overline{y}_k(t) = \frac{\sum_{j=1}^{M} \overline{f}_j(t)h_j^k(t)}{\sum_{j=1}^{M} \overline{f}_j(t)} \quad (6)$$

$$h_j^k(t) = \sum_{i=1}^{4} w_{ij}^k(t)x_i(t) + b_j^k(t)$$

where $\underline{y}_k(t)$ is a lower output of consequent neuron with respect to kth output neuron at time t, $\overline{y}_k(t)$ is an upper output of consequent neuron with respect to the kth output neuron at time t, hk j(t) is jth consequent factor with respect to the kth output at time t, wk ij(t) is a consequent weight of ith input with respect to jth rule neuron and the kth output at time t, bk j (t) is the deviation of the jth rule neuron with respect to the kth output at time t, k=1, 2;

the output layer contains 2 neurons, an output of each neuron is:

$$\Delta u_k(t) = q^k(t)\underline{y}_k(t) + (1 - q^k(t))\overline{y}_k(t) \quad (7)$$

where $\Delta u_k(t)$ is an output of kth output neuron at time t, $q^k(t)$ is a scale factor of the kth output neuron, $0 < q^k(t) < 1$;

(2) train T2FNN, which includes:

1) divide parameters of T2FNN into global and local parameters, and define a global parameter vector and a local parameter vector as:

$$\Phi_g(t) = [\underline{c}_{ij}(t), \overline{c}_{ij}(t), \sigma_{ij}(t)]$$

$$\Phi_l(t) = [w_{ij}^k(t), b_j^k(t), q^k(t)] \quad (8)$$

where $\Phi_g(t)$ is the global parameter vector at time t, $\Phi_l(t)$ is the local parameter vector at time t, and an objective function is:

$$l(t) = \alpha(t)l^1(t) + (1 - \alpha(t))l^2(t) \quad (9)$$

$$\alpha(t) = \frac{|l^1(t)|}{|l^1(t)| + |l^2(t)|}$$

$$l^1(t) = y_d^1(t) - y^1(t)$$

$$l^2(t) = y_d^2(t) - y^2(t)$$

where l(t) is a composite error at time t, α(t) is an error coefficient at time t, $l^1(t)$ is the error between the set-point and measured value of DO concentration at time t, $l^2(t)$ the error between the set-point and measured value of $NO_3$—N concentration at time t, y1 d(t) is the set-point of DO concentration at time t, y2 d(t) is the set-point of $NO_3$—N concentration at time t, $y^1(t)$ is a real value of DO concentration at time t, $y^2(t)$ is a real value of $NO_3$—N concentration at time t;

2) utilize parameter cooperative strategy to optimize the global and local parameters of T2FNN cooperatively, an updating rule of parameters is:

$$\Phi(t+1) = \Phi(t) + (H(t) + \theta(t)I)^{-1}G_l(t) \quad (10)$$

$$H(t) = J^T(t)J(t)$$

$$G_l(t) = J^T(t)l(t)$$

$$\theta(t) = \left|\frac{l(t)}{l(t) + l(t-1)}\right|\theta(t-1)$$

$$J(t) = \left[\frac{\partial l(t)}{\partial \Phi_g(t)}, \frac{\partial l(t)}{\partial \Phi_l(t)}\right] =$$

$$\left[\frac{\partial l(t)}{\partial \underline{c}_{ij}(t)}, \frac{\partial l(t)}{\partial \overline{c}_{ij}(t)}, \frac{\partial l(t)}{\partial \sigma_{ij}(t)}, \frac{\partial l(t)}{\partial w_{ij}^k(t)}, \frac{\partial l(t)}{\partial b_j^k(t)}, \frac{\partial l(t)}{\partial q^k(t)}\right]$$

where Φ(t+1) is a parameter vector at time t+1, Φ(t) is a parameter vector at time t, I is a unit matrix, H(t) is a quasi Hessian matrix at time t, $G_l(t)$ is an error gradient vector at time t, θ(t) is an adaptive learning rate at time t and θ(t)∈ (0, 1], J(t) is a Jacobian vector at time t, $\partial l(t)/\partial \Phi_g(t)$ is a partial derivative of the composite error with respect to the global parameter vector at time t, $\partial l(t)/\partial \Phi_l(t)$ is a partial derivative of the composite error with respect to the local parameter vector at time t, $\partial l(t)/\partial \underline{c}_{ij}(t)$ is partial derivatives of the composite error with respect to lower uncertain center at time t, $\partial l(t)/\partial \overline{c}_{ij}(t)$ is partial derivatives of the composite error with respect to the upper uncertain center at time t, $\partial l(t)/\partial \sigma_{ij}(t)$ is partial derivatives of the composite error with respect to the standard deviation at time t, $\partial l(t)/\partial wk\ ij(t)$ is partial derivative of the composite error with respect to the consequent weight at time t, $\partial l(t)/\partial bk\ j(t)$ is partial derivative of the composite error with respect to the deviation at time t, $\partial l(t)/\partial q^k(t)$ is partial derivative of the composite error with respect to the scale factor at time t;

(3) design the type-2 fuzzy neural network-based cooperative control method for controlling the DO and $NO_3$—N concentrations of WWTP, which includes:

1) calculate outputs of T2FNN according to Eq. (7);

2) compare a value of composite error with a pre-set threshold, if l(t)>β, go to step 3), and if l(t)≤β, go to step 4), where β is the pre-set threshold and β=0.01;

3) calculate updated values of parameters according to Eq. (10);

4) calculate control outputs at current time:

$$u_k(t) = u_k(t-1) + \Delta u_k(t) \quad (11)$$

where $u_k(t)$ is kth control output at time t, $u_1(t)$ is the control output with respect to an aeration value at time t, $u_2(t)$ is the control output with respect to an internal backflow value at time t, $u_k(t-1)$ is kth control output at time t−1, 5) enter uk(t) into WWTP to control the DO and NO3—N concentrations, return to step 1);

(4) use u1(t) and u2(t) to control the concentration of DO and NO3—N in WWTP, u1(t) is the control input of the aeration value at time t, u2(t) is the control input of the internal backflow value at time t, the control results are the concentrations of DO and NO3—N in WWTP. FIG. 3 gives the control results of DO concentration, X axis shows the time, and the unit is day, Y axis is the DO concentration, and the unit is mg/L, the black solid line is the set-points of DO concentration, and the black dotted line is the real value of DO concentration. FIG. 4 gives the control errors of DO concentration, X axis shows the time, and the unit is day, Y axis is the errors of DO concentration, and the unit is mg/L. FIG. 5 gives the control results of $NO_3$—N concentration, X axis shows the time, and the unit is day, Y axis is the $NO_3$—N concentration, and the unit is mg/L, the black solid line is the set-points of $N_3$—N concentration, and the black dotted line is the real value of $NO_3$—N concentration. FIG. 6 gives the control errors of $NO_3$—N concentration, X axis shows the time, and the unit is day, Y axis is the errors of NO₃—N concentration, and the unit is mg/L.

What is claimed is:

1. A type-2 fuzzy neural network-based cooperative control method for controlling dissolved oxygen (DO) and nitrate nitrogen (NO₃—N) concentrations of wastewater treatment process (WWTP), wherein aeration value and internal backflow value are used as control variables, the DO and NO₃—N concentrations are used as controlled variables, the method comprising the following steps:

(1) design a type-2 fuzzy neural network (T2FNN) for controlling the DO and NO₃—N concentrations, the T2FNN contains five-layers: an input layer, a membership layer, a rule layer, a consequent layer and an output layer, wherein:

the input layer contains 4 input neurons and an input vector is:

$$X(t) = [x_1(t), x_2(t), x_3(t), x_4(t)]^T \quad (1)$$

where $X(t)$ is the input vector of the T2FNN at time t, $x_1(t)$ is an error between a set-point and a measured value of DO concentration at time t, $x_2(t)$ is an error variation between the set-point and the measured value of DO concentration at time t, $x_3(t)$ is an error between a set-point and a measured value of NO₃—N concentration at time t, $x_4(t)$ is an error variation between the set-point and the measured value of NO₃—N concentration at time t, T represents a revolution of the weight matrix of the input layer and the input vector;

the membership layer contains P membership neurons and a neuron represents an interval type-2 membership function:

$$\underline{m}_{ij}(x_i(t)) = \begin{cases} e^{-\frac{1}{2}\left(\frac{x_i(t)-\overline{c}_{ij}(t)}{\sigma_{ij}(t)}\right)^2}, & x_i(t) \leq (\underline{c}_{ij}(t)+\overline{c}_{ij}(t))/2 \\ e^{-\frac{1}{2}\left(\frac{x_i(t)-\underline{c}_{ij}(t)}{\sigma_{ij}(t)}\right)^2}, & x_i(t) > (\underline{c}_{ij}(t)+\overline{c}_{ij}(t))/2 \end{cases} \quad (2)$$

$$\overline{m}_{ij}(x_i(t)) = \begin{cases} e^{-\frac{1}{2}\left(\frac{x_i(t)-\underline{c}_{ij}(t)}{\sigma_{ij}(t)}\right)^2}, & x_i(t) \leq \underline{c}_{ij}(t) \\ 1, & \underline{c}_{ij}(t) < x_i(t) < \overline{c}_{ij}(t) \\ e^{-\frac{1}{2}\left(\frac{x_i(t)-\overline{c}_{ij}(t)}{\sigma_{ij}(t)}\right)^2}, & x_i(t) \geq \overline{c}_{ij}(t) \end{cases} \quad (3)$$

where $P=4M$, M is a number of rule neurons, $1<M\leq 15$, $\underline{m}_{ij}(t)$ is a lower membership value of ith input to jth rule neuron at time t, $\overline{m}_{ij}(t)$ is an upper membership value of the ith input to the jth rule neuron at time t, $0<\underline{m}_{ij}(t)<\overline{m}_{ij}(t)\leq 1$, e is a natural constant and $e=2.7183$, $\underline{c}_{ij}(t)$ is a lower center of the ith input with the jth rule neuron at time t, $\overline{c}_{ij}(t)$ is an upper center of the ith input with the jth rule neuron at time t, $1<\underline{c}_{ij}(t)<\overline{c}_{ij}(t)<5$, $\sigma_{ij}(t)$ is standard deviation of the ith input with the jth rule neuron at time t, i is the number of inputs in the T2FNN and $i=1, 2, 3, 4$, j is the number of rule neurons and $j=1, 2, \ldots, M$;

the rule layer contains M rule neurons, an output of each neuron is:

$$F_j(t) = [\underline{f}_j(t), \overline{f}_j(t)] \quad (4)$$

$$\underline{f}_j(t) = \prod_{i=1}^{4} \underline{m}_{ij}(t), \overline{f}_j(t) = \prod_{i=1}^{4} \overline{m}_{ij}(t) \quad (5)$$

where $F_j(t)$ is firing strength of jth rule neuron at time t, $\underline{f}_j(t)$ is lower firing strength of the jth rule neuron at time t, $\overline{f}_j(t)$ is upper firing strength of the jth rule neuron at time t, $0<\underline{f}_j(t)<\overline{f}_j(t)\leq 1$;

the consequent layer contains 4 consequent neurons, an output of each neuron is:

$$\underline{y}_k(t) = \frac{\sum_{j=1}^{M} \underline{f}_j(t) h_j^k(t)}{\sum_{j=1}^{M} \underline{f}_j(t)}, \overline{y}_k(t) = \frac{\sum_{j=1}^{M} \overline{f}_j(t) h_j^k(t)}{\sum_{j=1}^{M} \overline{f}_j(t)} \quad (6)$$

$$h_j^k(t) = \sum_{i=1}^{4} w_{ij}^k(t) x_i(t) + b_j^k(t)$$

where $\underline{y}_k(t)$ is a lower output of consequent neuron with respect to kth output neuron at time t, $\overline{y}_k(t)$ is an upper output of consequent neuron with respect to the kth output neuron at time t, hk j(t) is jth consequent factor with respect to the kth output at time t, wk ij(t) is a consequent weight of ith input with respect to jth rule neuron and the kth output at time t, bk j (t) is the deviation of the jth rule neuron with respect to the kth output at time t, $k=1, 2$;

the output layer contains 2 neurons, an output of each neuron is:

$$\Delta u_k(t) = q^k(t) \underline{y}_k(t) + (1 - q^k(t)) \overline{y}_k(t) \quad (7)$$

where $\Delta u_k(t)$ is an output of kth output neuron at time t, $q^k(t)$ is a scale factor of the kth output neuron, $0<q^k(t)<1$;

(2) train the T2FNN, which includes:
1) divide parameters of the T2FNN into global and local parameters, and define a global parameter vector and a local parameter vector as:

$$\Phi_g(t) = [\underline{c}_{ij}(t), \overline{c}_{ij}(t), \sigma_{ij}(t)]$$

$$\Phi_l(t) = [w_{ij}^k(t), b_j^k(t), q^k(t)] \quad (8)$$

where $\Phi_g(t)$ is the global parameter vector at time t, $\Phi_l(t)$ is the local parameter vector at time t, and an objective function is:

$$l(t) = \alpha(t) l^1(t) + (1 - \alpha(t)) l^2(t) \quad (9)$$

$$\alpha(t) = \frac{|l^1(t)|}{|l^1(t)| + |l^2(t)|}$$

$$l^1(t) = y_d^1(t) - y^1(t)$$

$$l^2(t) = y_d^2(t) - y^2(t)$$

where l(t) is a composite error at time t, $\alpha(t)$ is an error coefficient at time t, $l^1(t)$ is the error between the set-point and measured value of DO concentration at time t, $l^2(t)$ the error between the set-point and measured value of NO₃—N concentration at time t, yl d(t) is the set-point of DO concentration at time t, y2 d(t) is the set-point of NO₃—N concentration at time t, $y^1(t)$ is a real value of DO concentration at time t, $y^2(t)$ is a real value of NO₃—N concentration at time t;

2) utilize parameter cooperative strategy to optimize the global and local parameters of the T2FNN cooperatively, an updating rule of parameters is:

$$\Phi(t+1) = \Phi(t) + (H(t) + \theta(t)I)^{-1} G_l(t) \quad (10)$$

$$H(t) = J^T(t)J(t)$$

$$G_l(t) = J^T(t)l(t)$$

$$\theta(t) = \left| \frac{l(t)}{l(t) + l(t-1)} \right| \theta(t-1)$$

$$J(t) = \left[ \frac{\partial l(t)}{\partial \Phi_g(t)}, \frac{\partial l(t)}{\partial \Phi_l(t)} \right] =$$

$$\left[ \frac{\partial l(t)}{\partial \underline{c}_{ij}(t)}, \frac{\partial l(t)}{\partial \overline{c}_{ij}(t)}, \frac{\partial l(t)}{\partial \sigma_{ij}(t)}, \frac{\partial l(t)}{\partial w_{ij}^k(t)}, \frac{\partial l(t)}{\partial b_{ij}^k(t)}, \frac{\partial l(t)}{\partial q^k(t)} \right]$$

where $\Phi(t+1)$ is a parameter vector at time t+1, $\Phi(t)$ is a parameter vector at time t, I is a unit matrix, H(t) is a quasi Hessian matrix at time t, $G_l(t)$ is an error gradient vector at time t, $\theta(t)$ is an adaptive learning rate at time t and $\theta(t) \in (0, 1]$, J(t) is a Jacobian vector at time t, $\partial l(t)/\partial \Phi_g(t)$ is a partial derivative of the composite error with respect to the global parameter vector at time t, $\partial l(t)/\partial \Phi_l(t)$ is a partial derivative of the composite error with respect to the local parameter vector at time t, $\partial l(t)/\partial \underline{c}^{ij}(t)$ is partial derivatives of the composite error with respect to lower uncertain center at time t, $\partial l(t)/\partial \overline{c}_{ij}(t)$ is partial derivatives of the composite error with respect to the upper uncertain center at time t, $\partial l(t)/\partial \sigma_{ij}(t)$ is partial derivatives of the composite error with respect to the standard deviation at time t, $\partial l(t)/\partial wk\, ij(t)$ is partial derivative of the composite error with respect to the consequent weight at time t, $\partial l(t)/\partial bk\, j(t)$ is partial derivative of the composite error with respect to the deviation at time t, $\partial l(t)/\partial q^k(t)$ is partial derivative of the composite error with respect to the scale factor at time t;

(3) design the type-2 fuzzy neural network-based cooperative control method for controlling the DO and $NO_3$—N concentrations of the WWTP, which includes:

1) calculate outputs of the T2FNN according to Eq. (7);
2) compare a value of composite error with a pre-set threshold, if $l(t) > \beta$, go to step 3), and if $l(t) \leq \beta$, go to step 4), where $\beta$ is the pre-set threshold and $\beta = 0.01$;
3) calculate updated values of parameters according to Eq. (10);
4) calculate control outputs at current time:

$$u_k(t) = u_k(t-1) + \Delta u_k(t) \quad (11)$$

where $u_k(t)$ is kth control output at time t, $u_1(t)$ is the control output with respect to an aeration value at time t, $u_2(t)$ is the control output with respect to an internal backflow value at time t, $u_k(t-1)$ is kth control output at time t−1, 5) enter $u_k(t)$ into the WWTP to control the DO and $NO_3$—N concentrations, return to step 1);

(4) use $u_1(t)$ and $u_2(t)$ to control the concentration of DO and $NO_3$—N in the WWTP, $u_1(t)$ is the control input of the aeration value at time t, $u_2(t)$ is the control input of the internal backflow value at time t, the control results are the concentrations of DO and $NO_3$—N in the WWTP.

\* \* \* \* \*